Aug. 11, 1936.   J. J. THAYER   2,050,547
CASE LOADER
Filed May 27, 1932   12 Sheets-Sheet 1

INVENTOR
Josephus J. Thayer
Jones, Addington, Ames & Seibold
ATTORNEYS

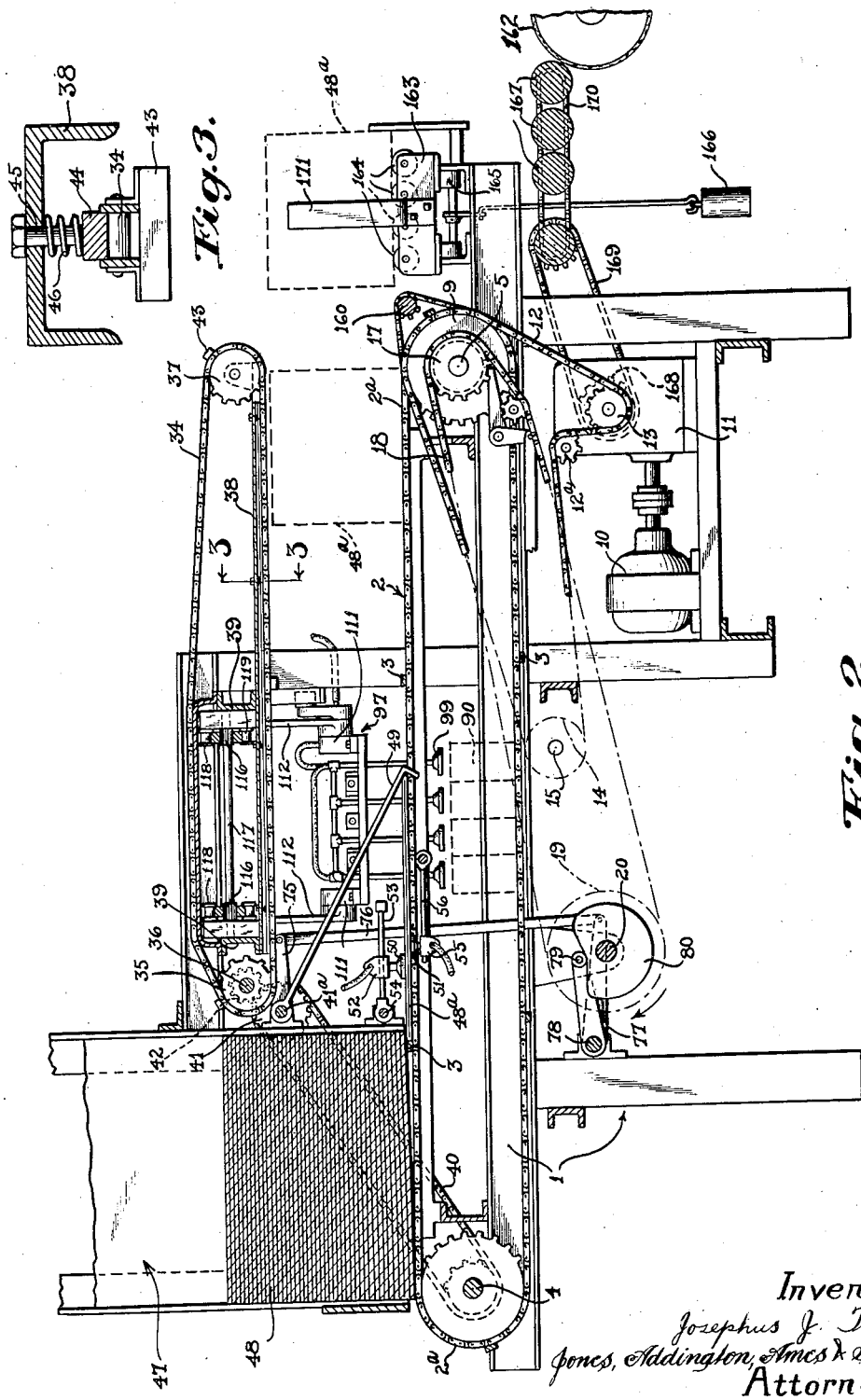

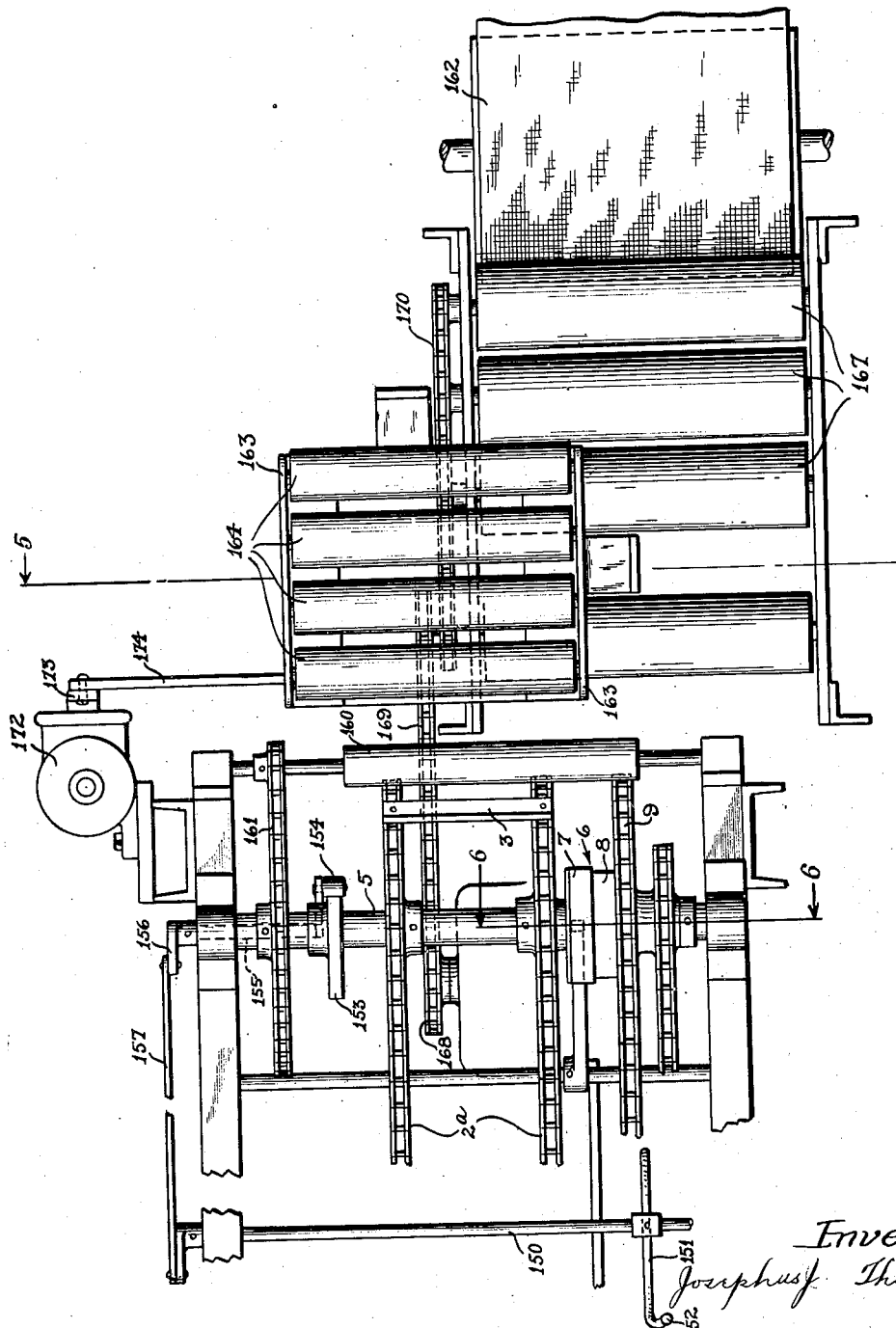

Aug. 11, 1936.    J. J. THAYER    2,050,547
CASE LOADER
Filed May 27, 1932    12 Sheets-Sheet 4
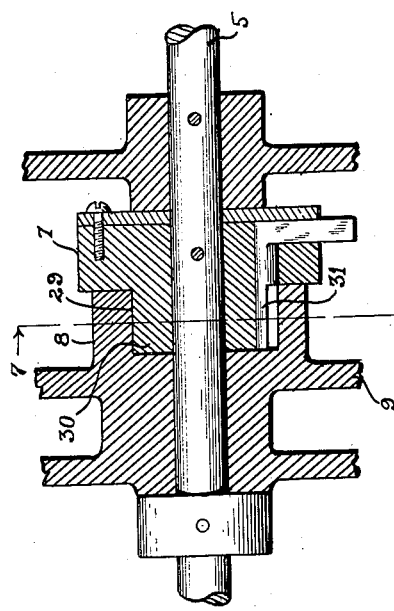
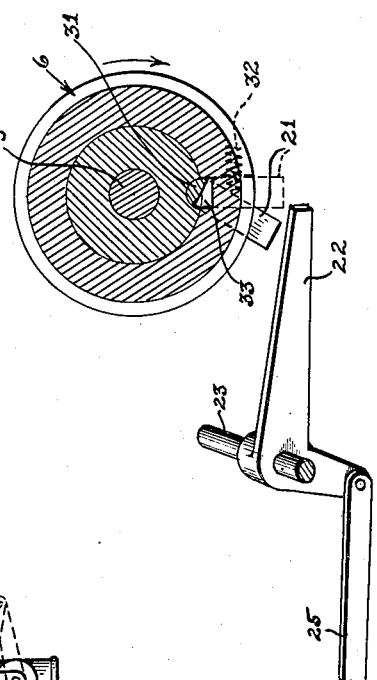
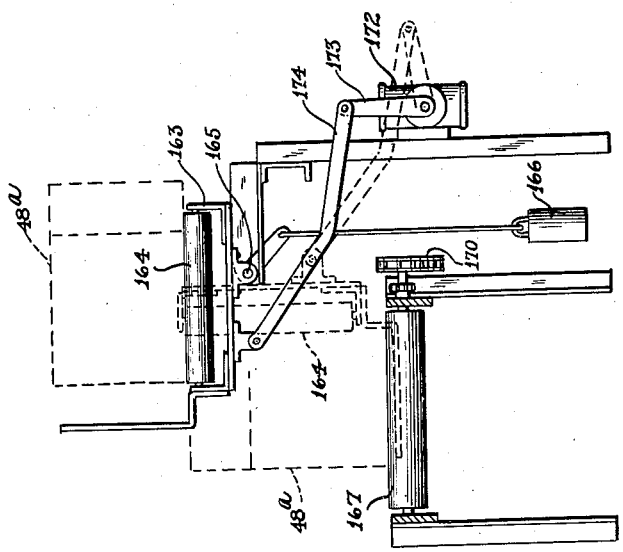
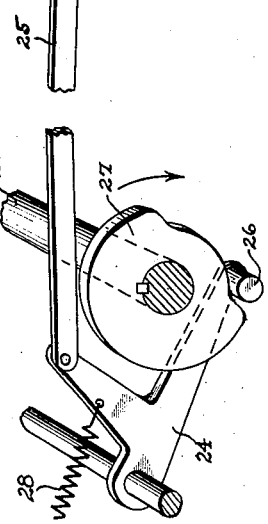
Inventor:
Josephus J. Thayer
By Jones, Addington, Ames & Seibold
Attorneys.

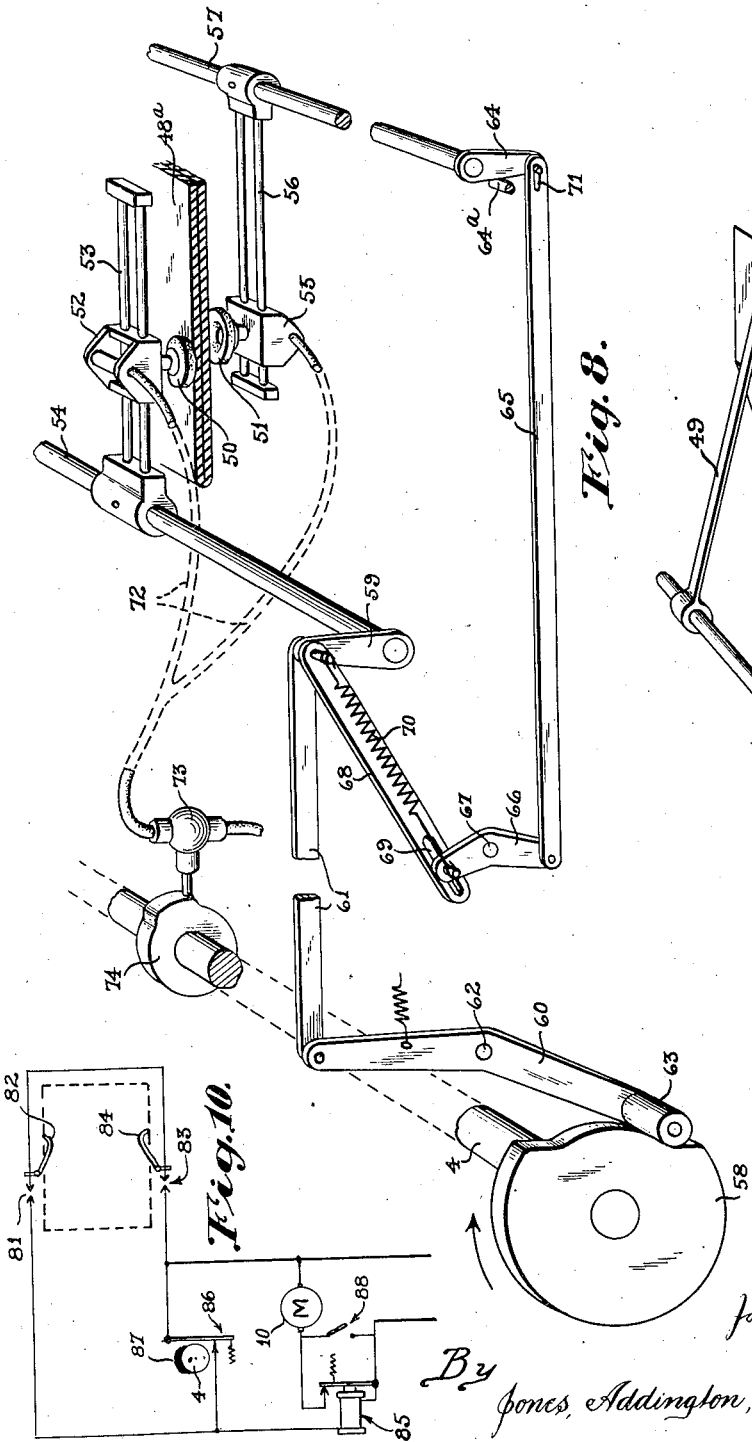

Aug. 11, 1936.  J. J. THAYER  2,050,547
CASE LOADER
Filed May 27, 1932  12 Sheets-Sheet 6
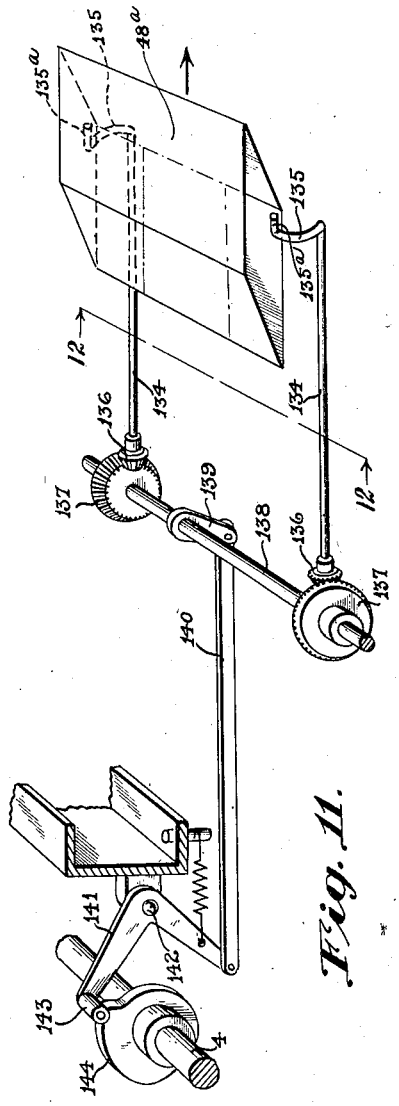
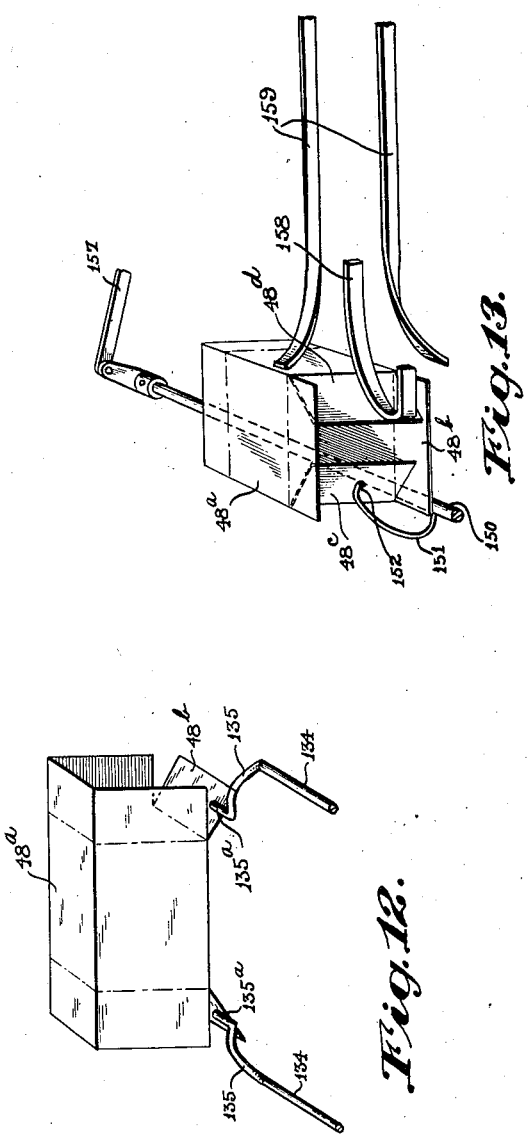
Inventor:
Josephus J. Thayer
By Jones, Addington, Ames, & Seibold
Attorneys

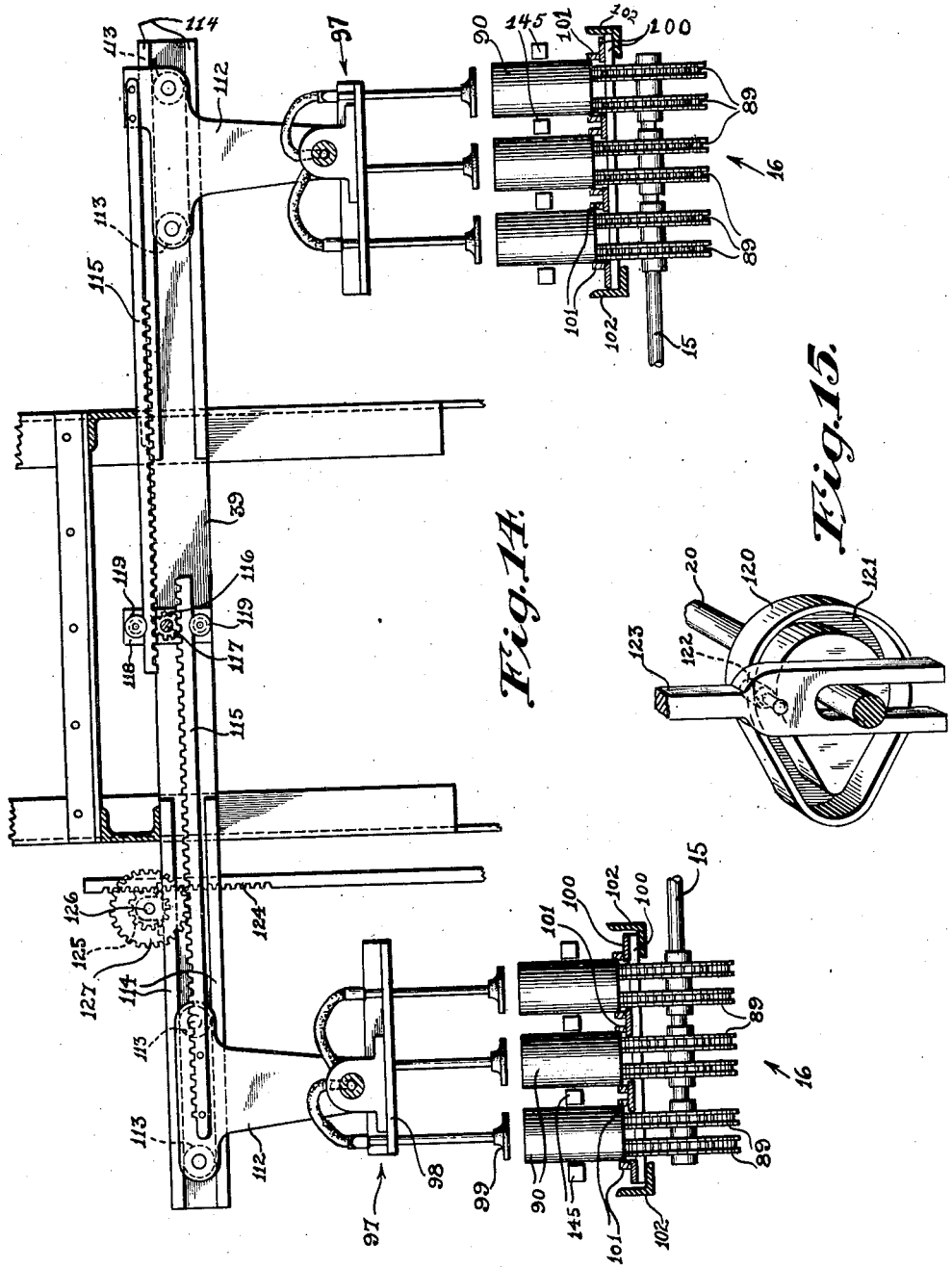

Aug. 11, 1936.  J. J. THAYER  2,050,547
CASE LOADER
Filed May 27, 1932   12 Sheets-Sheet 8

INVENTOR
Josephus J. Thayer
Jones, Addington, Ames & Seibold
ATTORNEYS

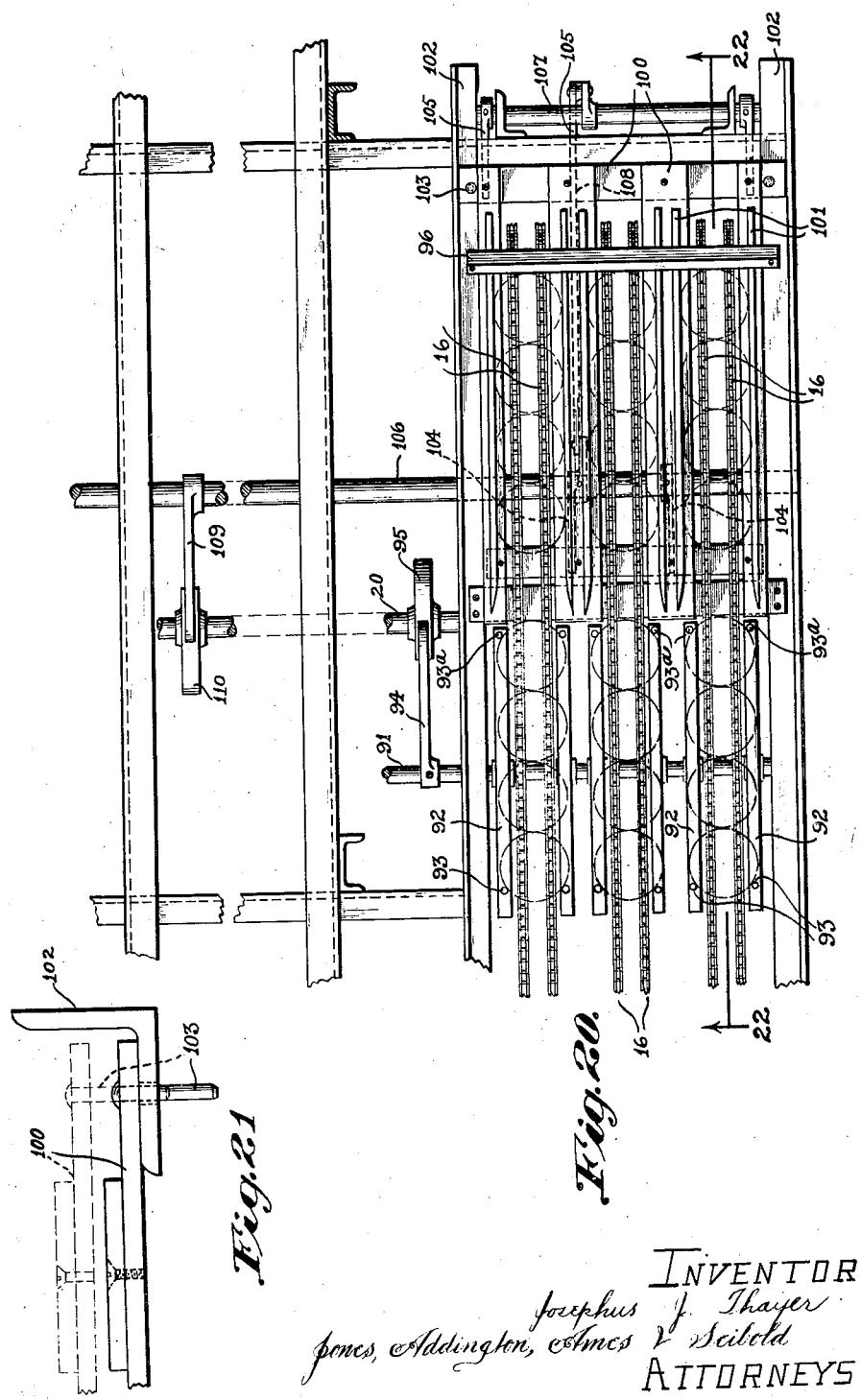

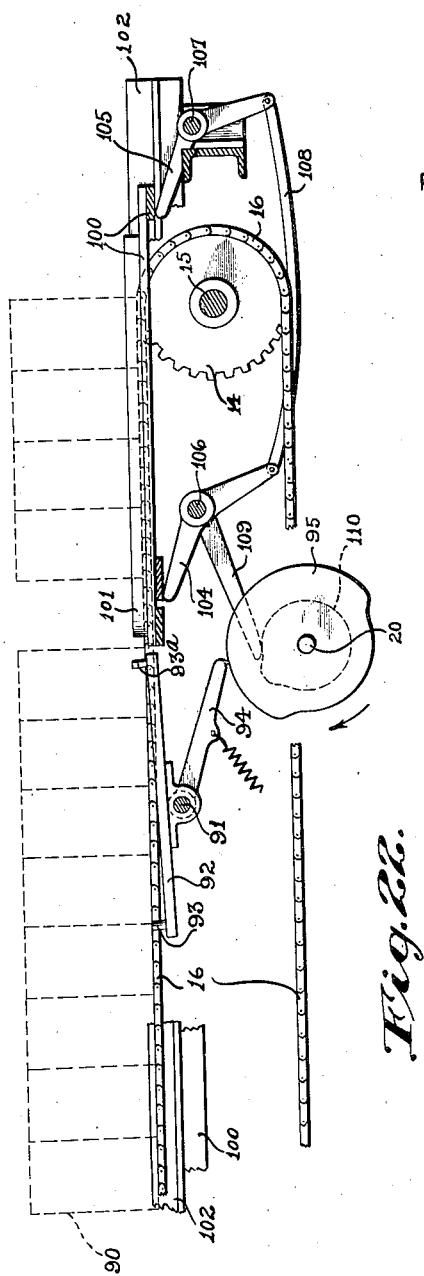

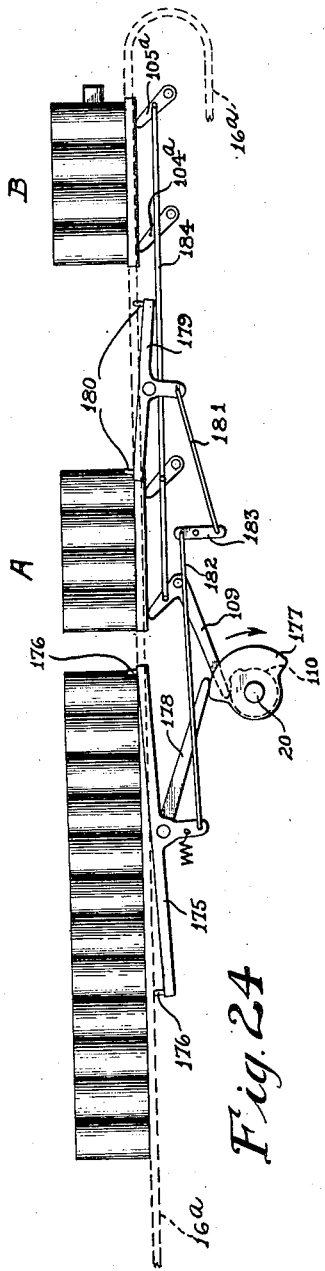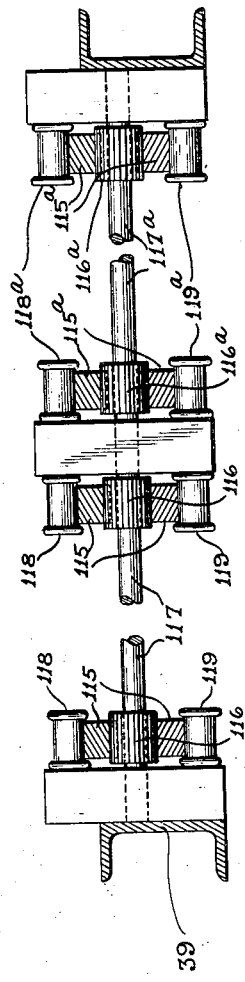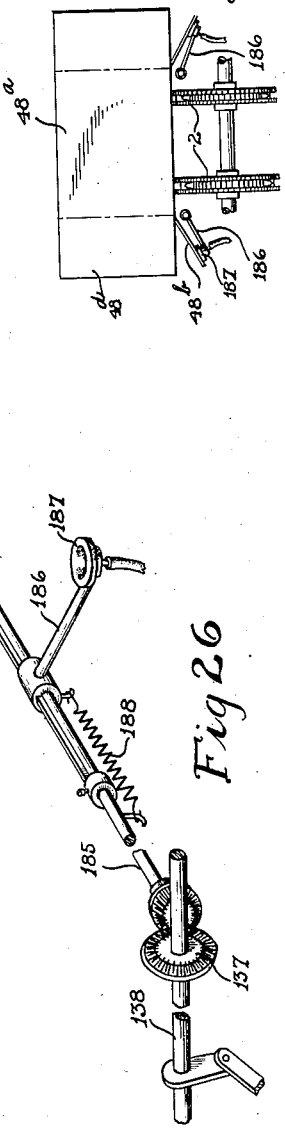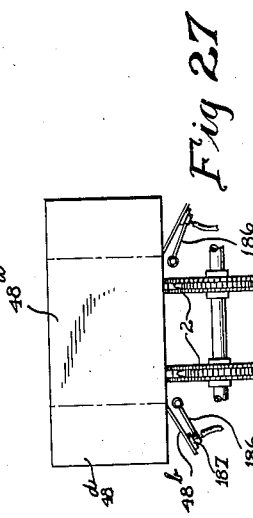

Aug. 11, 1936.     J. J. THAYER     2,050,547
CASE LOADER
Filed May 27, 1932     12 Sheets-Sheet 12
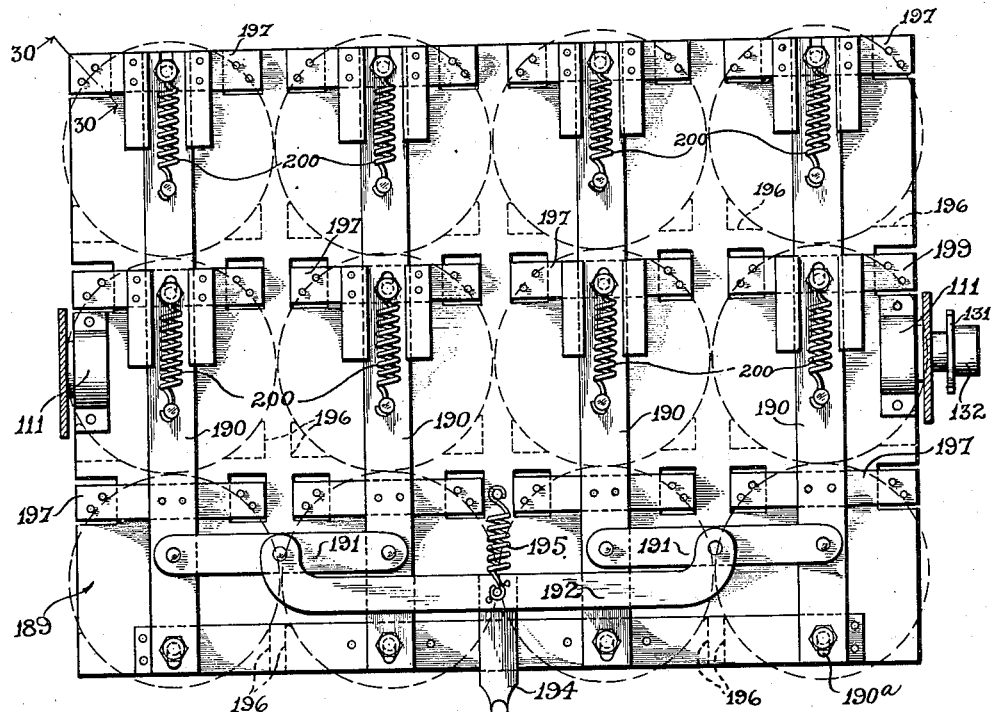
Fig 28
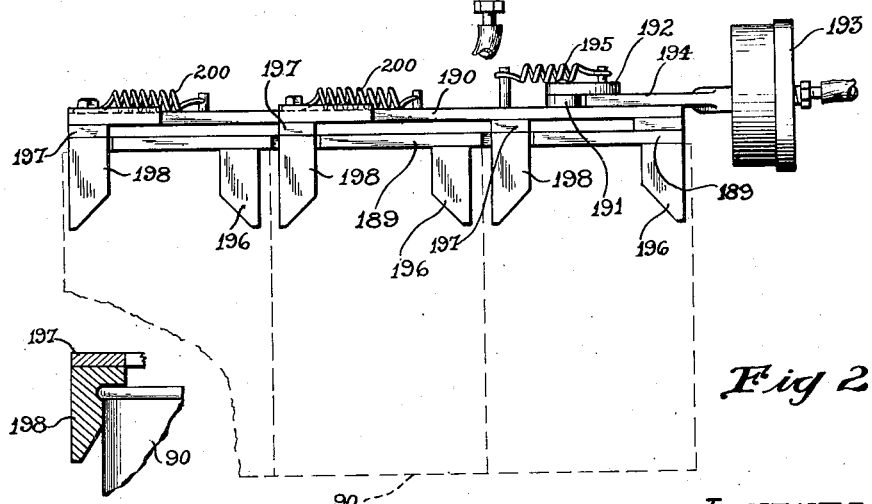
Fig 29
Fig 30
INVENTOR
Josephus J. Thayer
Jones, Addington, Ames & Seibold
ATTYS Patented Aug. 11, 1936

2,050,547

UNITED STATES PATENT OFFICE 2,050,547

CASE LOADER

Josephus J. Thayer, Hollywood, Ill., assignor to J. L. Ferguson Company, a corporation Application May 27, 1932, Serial No. 613,812

42 Claims. (Cl. 226—14)

My invention relates to case loading machines, and more particularly to machines arranged to receive containers from conveyers and automatically and simultaneously insert a plurality of these containers in the form of tiers or layers into suitable cases.

Certain case loading machines have been previously used wherein a plurality of small containers have been simultaneously inserted in cases to form a tier or layer therein. However, these machines have been comparatively slow and inefficient as only one tier at a time could be inserted in the case.

The present invention provides a machine wherein a plurality of layers, each comprising a plurality of small containers, may be simultaneously inserted in a case, and in which the machine is so constructed that a case may be completely loaded with each operation of the loading mechanism, that is, whereby a plurality of containers sufficient to completely fill a case may be moved from suitable conveyers into the case thereby filling it at a single operation.

This invention further contemplates a case filling machine providing for continuous operation whereby collapsed cartons may be consecutively opened and a plurality of layers of containers may be inserted simultaneously therein.

It is also an object of the invention to provide a device wherein consecutive collapsed cases may be automatically opened and a plurality of containers be inserted therein in opposite directions for completely filling the case, or wherein, in certain instances, a plurality of layers may be inserted, and the continuous operation of the machine will insert further layers either singly or a plurality simultaneously to complete the filling of the case.

It is also an object to provide a case filling machine for continuous operation wherein a plurality of containers may be removed from a conveyer and automatically carried by arcuate movement into alignment with an open container and inserted therein.

It will be obvious that modifications may be made in the particular structure illustrated in the present application without departing from the spirit of the invention. However, in practicing the invention in accordance with the embodiment herein illustrated, a suitable frame work is provided on which is supported an intermittently movable horizontal conveyer. This conveyor is arranged to consecutively remove collapsed cases from a magazine.

As these collapsed cases are removed from the magazine, vacuum cups engage suitable portions thereof and cooperate with mechanical edge engaging members to open the case. The continued movement of the conveyer in cooperation with the cups and members mentioned serves to open the case which is then in squared out open transverse relation to the conveyer and resting thereon.

When the case is completely opened the conveyer is automatically stopped, and if the case is correctly positioned on the conveyer, in opened position in the loading zone, suitable electrical switches are tripped by the complete opening process whereby the machine will continue to operate for loading the containers in the case. However, if the case is not properly positioned these switches are not operated and all further machine operation will be stopped until the case is removed or correctly positioned.

A constantly moving conveyer is positioned on each side of the case conveyer for carrying containers to points adjacent the loading zone and adjacent each open end of the squared out case. A suitable stopping and tripping mechanism automatically operates to separate and position consecutive groups of containers in transverse alignment with the case but in a somewhat lower plane.

Transversely movable carriages having vacuum cup container engaging means thereon then simultaneously lift the groups of containers, and by an inward rotary and transverse movement move the containers through arcuate paths into alignment with and into the open ends of the cases and the carriages then release the containers and return immediately to normal stationary position. The filled cases are then automatically moved forward by the intermittent movement of the case conveyer and another collapsed case is removed from the magazine and opened and filled in a similar manner.

In order that the containers during the arcuate movement into the case may clear the lower flap, these flaps are automatically engaged and further opened by a suitable flap engaging means.

During the intermittent forward movement of the filled container, the end flaps on one end of the case are closed by a suitable flap closing means and the filled case moves from the case conveyer to a turning device which turns the case and deposits it on its closed end, on a suitable discharge conveyer. This latter conveyer is preferably a constantly moving device and may be used in connection with or form a part of a suitable case sealing mechanism if desired.

Further objects will be apparent from the specification and the appended claims.

In the drawings:

Fig. 2 is an elevation partially in longitudinal section of the embodiment illustrated in Fig. 1;

Fig. 3 is a detailed sectional view taken on a line corresponding to line 3—3 of Fig. 2;

Fig. 4 is a top plan view of the discharge end of the machine and illustrates the clutch mechanism and the means whereby a filled case is discharged from the machine to a suitable conveyer;

Fig. 5 is an end view of a portion of the discharge mechanism, the discharge conveyer mechanism being shown in section on a line corresponding to line 5—5 of Fig. 4;

Fig. 6 is a longitudinal section through the main clutch and is taken on a line corresponding to line 6—6 of Fig. 4;

Fig. 7 is a transverse section through the clutch and control mechanism therefor and is taken on a line corresponding to line 7—7 of Fig. 6;

Fig. 8 is a perspective view of a portion of the automatic case-opening mechanism;

Fig. 9 is a perspective view of another portion of the case-opening mechanism and shown in connection with the conveyer and case;

Fig. 10 is a diagrammatic view of the electrical control mechanism for controlling the operation of the machine relative to the position of a case;

Fig. 11 is a perspective view of the automatic flap opening mechanism;

Fig. 12 is a perspective view of a portion of the flap opening mechanism illustrated in Fig. 11 and is taken on a line corresponding to line 12—12 of Fig. 11;

Fig. 13 is a perspective view of the flap closing means;

Fig. 14 is a transverse sectional view taken on a line substantially corresponding to line 14—14 of Fig. 1 and illustrates the mechanism for moving the containers from the conveyers into the case;

Fig. 15 is a detail perspective view of the carriage moving cam and associated mechanism for operating the case loading device illustrated in Fig. 14;

Fig. 20 is a top plan view of one of the container conveyers and container grouping and lifting mechanism;

Fig. 21 is a detailed end view of a portion of the guide means for the container lifting frame;

Fig. 22 is a longitudinal sectional view through the container conveyer and container grouping and lifting means and taken substantially on line 22—22 of Fig. 20;

Fig. 23 is a diagrammatic view illustrating the relative location of the containers, conveyers and cases during the operation of filling large cases with more than two layers of container. The machine is slightly modified for this purpose;

Fig. 24 is a side elevation of a modified form of stopping and tripping mechanism which is used when the machine is arranged to fill the cases with containers in a manner illustrated diagrammatically in Fig. 23;

Fig. 25 is a detailed view partially in section through the rack controlling mechanism for operating a plurality of case loading devices to complete the loading operation in conformity with the method illustrated in Fig. 23, and in cooperation with the mechanism illustrated in Fig. 24;

Fig. 26 is a perspective view of a modified mechanism provided with vacuum controlled flap engaging means whereby the lower flaps of the case may be further opened and held out of the arcuate path of the containers, and may be used in place of the mechanism illustrated in Figs. 11 and 12;

Fig. 27 is a side elevation of one of the cases on the conveyer in opened position and illustrates the relative position of the case and flap controlling mechanism shown in Fig. 26;

Fig. 28 is a top plan view of a modified container carriage and incorporates mechanical means whereby containers may be engaged and supported by mechanical engagement instead of by the use of vacuum cups;

Fig. 29 is an end view of the carriage illustrated in Fig. 28; and

Fig. 30 is a detailed sectional view through one of the container gripping means in cooperation with a container and is taken on a line corresponding to line 30—30 of Fig. 28.

Figure 1:
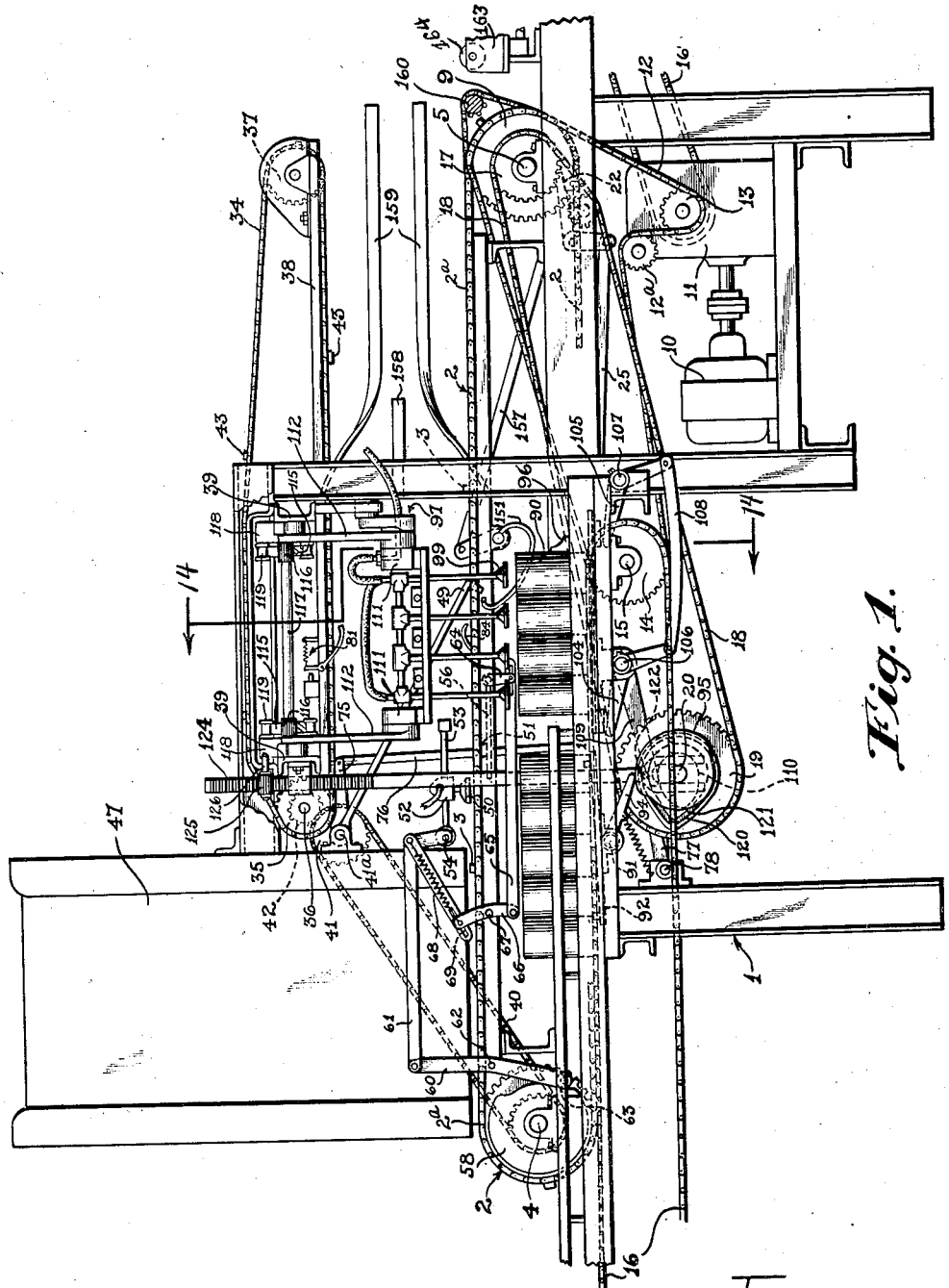
Figure 1 is a side elevation of one embodiment of my invention.
Figure 18:
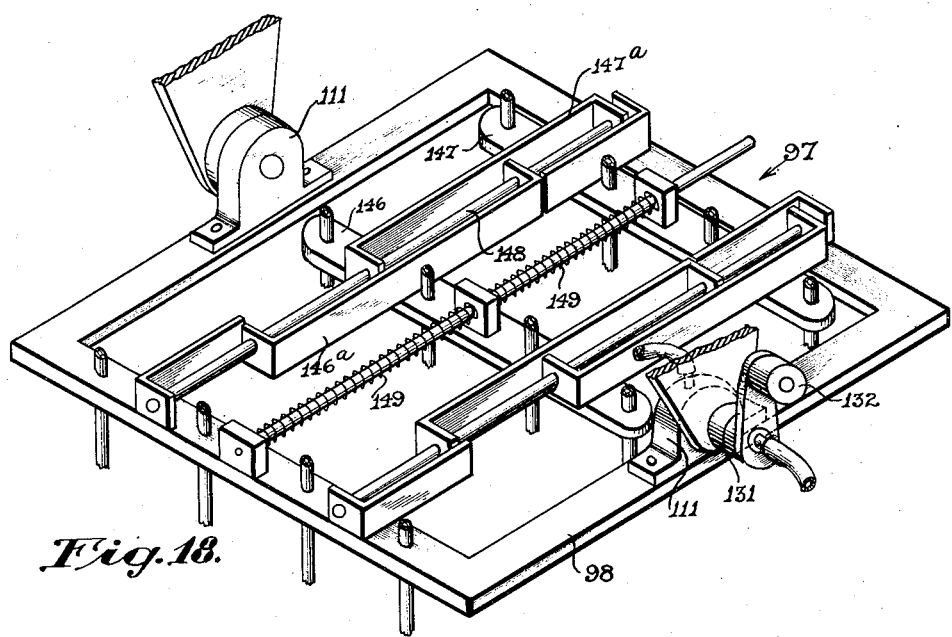
Fig. 18 is a perspective view of the container carriage mechanism.
Figure 16:
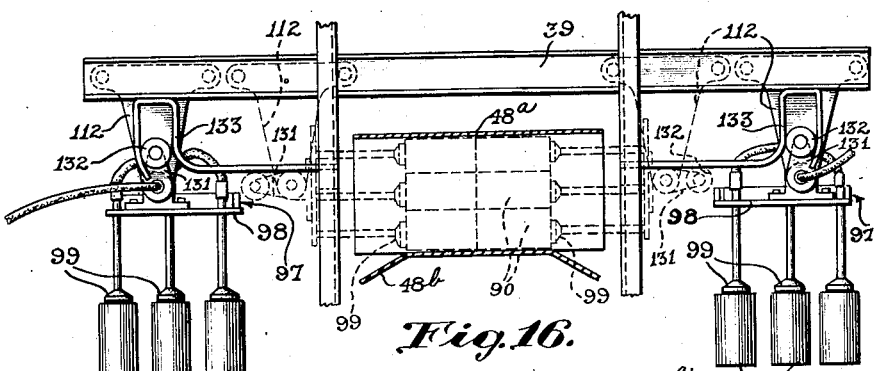
Fig. 16 is a front view of the container handling mechanism illustrated in Fig. 14, illustrating the method of inserting the containers in the case.
Figure 17:
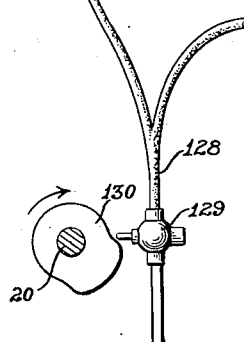
Fig. 17 is a detailed elevation of the vacuum control valve and the connections therefor, together with the valve operating cam as used in cooperation with the case loading device illustrated in Fig. 16.
Figure 19:
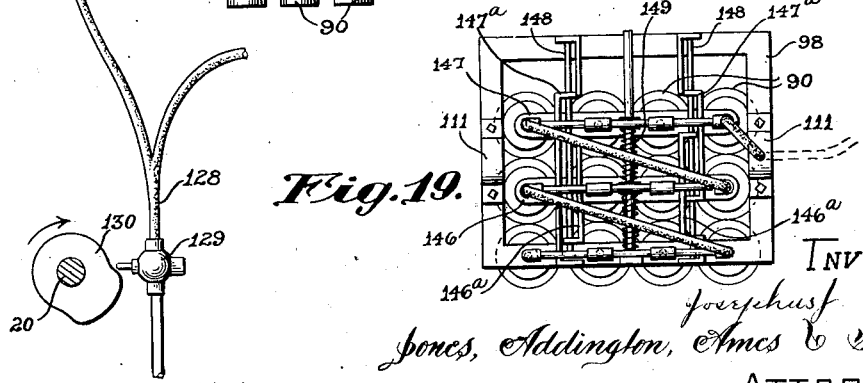
Fig. 19 is a top plan view of the completely assembled container carriage.

Referring to the drawings in detail, the embodiment illustrated comprises a frame 1 having an intermittently movable longitudinal conveyer 2 thereon which latter comprises a pair of spaced conveyer chains 2a, as illustrated in Fig. 4, on which are mounted a plurality of case engaging flights 3. These flights are so spaced on the conveyer chains 2a that the intermittent movement of the conveyer will cause them to correctly position each consecutive case for the filling and other operations connected therewith.

The chains 2a are mounted on suitable sprockets secured to transverse shafts 4 and 5 rotatably mounted in suitable bearings at the rear and front of the machine, respectively.

The case conveyer 2 is intermittently driven through a clutch 6 on the shaft 5 and which is automatically tripped, to control the intermittent operation of the conveyer, by a mechanism which will be described later.

The clutch 6 comprises a driven member 7 secured to the conveyer shaft 5, and a driving member 8 forming part of a driving sprocket 9. The driving member 8 is driven from a motor 10 through a suitable speed reduction mechanism 11 and a chain 12 connecting a sprocket 13 and the clutch sprocket 9.

The drive chain 12 also extends rearwardly over an idler 12a and engages another sprocket 14 on a transverse shaft 15 (Figs. 1 and 2). The sprocket 14 is diagrammatically indicated in Fig. 2 and the shaft 15, as indicated in Figs. 1 and 14, is arranged to drive container conveyers 16, one of which is mounted on each side of the frame 1 and in parallel relation with the case conveyer 2 but in a somewhat lower plane.

The container conveyers 16 are constantly driven through the mechanism just described and, in cooperation with suitable container escapement mechanism, assemble and position groups of containers whereby they may be readily moved into the open ends of intermittently positioned cases on the case conveyer 2.

A sprocket 17 is secured to and in the present instance forms a part of the driving clutch member 8 and sprocket 9 and drives a rearwardly extending chain 18 which in turn drives a sprocket 19 on a constantly driven transverse main shaft 20.

The clutch 6 is controlled, to intermittently drive the case conveyer 2, by means of a trip mechanism illustrated in Fig. 7. The clutch in Fig. 7 is shown in section with the parts in engaged driving relation whereby the conveyer 2 will be driven by the motor 10. This clutch includes a spring pressed pivoted pawl 21 which, in the position shown, causes the clutch to be engaged.

In order to stop the movement of the case conveyer 2, it is necessary that the outwardly extending arm of the clutch pawl 21 be engaged and retained in the dotted line position. This may be accomplished by means of a trip lever 22 pivoted at 23 and connected to a spring controlled cam arm 24 by means of a link 25.

The cam arm 24 is provided with a roller 26 arranged to engage the periphery of a cam 27 secured to the main shaft 20. A spring 28 retains the roller 26 in engagement with the cam and, in the position shown, the trip lever 22 is disengaged from the clutch pawl 21 to allow clutch engagement. The contour of the cam 27 is such that during the revolution of the main shaft 20, the trip lever 22 is released from engagement with the clutch pawl 21 and the clutch will then be engaged to drive the case conveyer 2 until again disengaged by the control mechanism described.

The clutch 6 is illustrated in detail in Fig. 6. The driving member 8 is provided with an annular concentric bore 29 into which extends a reduced cylindrical portion 30 of the driven member 7. The bore 29 is machined for a free-running fit on the cylindrical portion 30. The clutch pawl 21 is pivoted in the driven member 7, and is provided with a reduced engaging portion 31 which is machined on a radius substantially equal to the radius of the reduced cylindrical portion of the driven member. The outwardly extending arm of the pawl is normally held in the position shown in Fig. 7 by means of a spring 32. In this position the reduced portion 31 is engaged in a slot 33 in the cylindrical wall of the driving member 8. It is obvious that when the pawl is in the position shown in Fig. 7 with the driving member 8 rotating in the direction of the arrow, the driving and driven members will be locked together by the pawl 21 and the shaft 5 will be rotated to drive the case conveyer 2. It will also be obvious that when the trip lever 22 is raised into the path of the pawl by the cam 27, the clutch 6 will be disengaged due to the positioning of the pawl 21 whereby it is released from the slot 33 in the driving member.

The main shaft 20 also controls, through suitable mechanism, other important functions relative to the loading of the containers in the cases.

An auxiliary conveyer chain 34 is mounted in parallel spaced relation above the case conveyer 2. This conveyer chain is mounted on a driven sprocket 35 which is secured to a transverse shaft 36 on the frame 1, and a sprocket 37 rotatably mounted on a forwardly extending guide channel 38 which latter is secured to cross bars or channel irons 39 of the frame. The sprocket shaft 36 is driven from the conveyer shaft 4 by a transmission comprising a chain 40 on suitable sprockets, and intermediate driving gears 41 and 42, the gear 41 and its adjacent sprocket being secured together and loosely mounted for rotation on a traverse shaft 41a.

The auxiliary sprocket chain 34 is provided with flights 43 and is driven in synchronism with the conveyer 2. This construction provides an efficient means for moving the loaded cases from the machine.

The chain 34 engages a guide member 44 (Fig. 3) which latter is resiliently mounted on the extension guide channel 38 by means of bolts 45 and springs 46. This resilient guide allows for slight variations in the size of the cases.

A magazine 47 is vertically positioned above one end of the conveyer 2 as illustrated in Fig. 2 and a stack of collapsed cases 48 may be supported therein. During each intermittent movement of the conveyer, the edge of the collapsed case will be engaged by one of the flights 3 and a case will be moved forwardly, as indicated by the reference character 48a, until the forward end of the collapsed case engages the down-turned ends of opening hooks 49.

These hooks and their operation are better illustrated in Fig. 9. The hooks are secured to the transverse rock shaft 41a and are arranged to be mechanically raised in synchronism with the movement of the conveyer 2 and the opening of the collapsed case thereon. This automatic operation will be explained in detail later.

It will be understood that the further movement of the conveyer 2 will tend to cause the hooks 49 to open the case 48a as illustrated, and the still further movement of the case by the conveyer will cause the complete opening and squaring up of the case. However, these cases are usually made of stiff board with the fold lines creased and are not always easily opened by this means alone. Therefore, further means have been provided to assist the opening operation.

This means is more particularly illustrated in Figs. 2 and 8, and comprises vacuum cups 50 and 51 which are arranged to engage the side and bottom portions, respectively, of the moving case and cooperate with the opening hooks 49. The vacuum cup 50 which is to engage the upper surface of the side of the case is mounted on a carriage 52 which is in turn slidably mounted on rods 53 which latter are secured to a transverse rock shaft 54. The vacuum cup 51 is in a like manner mounted on a carriage 55 slidably mounted on rods 56 which latter are secured to a transverse rock shaft 57. The rock shafts 54 and 57 are intermittently operated in synchronism with the moving case by means of a cam 58 on the conveyer shaft 4, the rock shaft 54 being provided with an arm 59 connected to a cam arm 60 by means of a link 61. The cam arm 60 is pivoted at 62 and provided with a cam roller 63 engaging the cam 58.

With each revolution of the cam 58, and therefore during each intermittent movement of the conveyer 2, the vacuum cup 50 will be raised and lowered, and by the operation of suitable vacuum control means, the cup will engage and lift the side of the case 48a during the forward movement of the case, and during this forward movement and while the vacuum cup is engaged with the case the carriage 52 will slide forward on the guide rods 53 therefore allowing the vacuum cup to retain its engagement with the case during the opening movement.

The rock shaft 57 is provided with a downwardly extending arm 64 which is connected to the arm 59 on rock shaft 54 by means of a link 65, a rock arm 66 pivoted at 67, and a link 68.

The link 68 is slotted at 69 and a spring 70 tends to retain the arm 64 against a stop 64a which may be secured on an adjacent part of the frame. The link 65 is also slotted at 71. The slots 69 and 71 provide sufficient lost motion whereby extreme accuracy in the construction and operation of the device is unnecessary, and the spring 70 retains the arm 64 against the stop 64a during the engagement of the lower vacuum cup 51.

The lower vacuum cup 51 is normally out of engagement until a case has reached a position for opening. The vacuum cups 50 and 51 are normally out of engaging position, the guide rods 53 being raised and the guide rods 56 being lowered.

The engagement of the vacuum cups 50 and 51 is controlled through suitable flexible tubes 72 which are connected to a vacuum power source through a valve 73. This valve is intermittently controlled by means of a cam 74 on the shaft 4. The contour of this cam is such that the vacuum is created simultaneously with the contact of the cups 50 and 51 with the opposite sides of the collapsed case.

In the operation of this device, the guide rods 53 are held in raised position, and the guide rods 56 are held in lowered position by means of the cam 58 until a collapsed case is in position to be engaged. The continuous rotation of the cam 58 then causes the guide rods 52 and 56 to be moved to the position shown in Fig. 8 whereby the cups engage opposite sides of the case. While the hooks 49 are tending to open the case and to prevent the forward movement of the upper part thereof, the vacuum cup 51 will move forwardly with the case as the carriage 52 slides on the guide rods 56 which are, at this time, parallel with the lower surface of the case. The spring 70 and the slot 69 allow the guide rods 56 to remain in the horizontal position shown and the cup 51 thereby retains the lower surface of the case in engagement with the conveyer until the cam 47 releases the valve 73 and the vacuum cups 50 and 51 are released from the case. The carriages 52 and 55 then return by gravity to their original positions. The hooks 49 engaging the forward edge of the collapsed case cooperate with the mechanism just described to complete the opening or squaring out and positioning of each consecutively moved collapsed case 48a.

The hooks (Figs. 2 and 9), as stated previously, are secured to the transverse rock shaft 41a which is provided with a forwardly extending arm 75 connected by means of a link 76 to a cam rock arm 77 pivoted at 78 on the frame. This cam rock arm is provided with a cam roller 79 engaging a cam 80 on the main shaft 20. The cam 80 is so arranged that the upward movement of the hooks 49 in squaring out the case is timed for cooperation with the operation of the vacuum cups and the forward movement of the collapsed case on the conveyer 2.

The machine is provided with a suitable electrically controlled system whereby it will be stopped if one of the cases fails to reach a properly opened position. The electrical system and control mechanism for this purpose is illustrated in Fig. 10 and comprises a switch 81 mounted on the channel guide member 38 and above the path of the case and provided with a switch arm 82 extending into a position to be engaged by the upper surface of the case to close the switch when the case is completely opened.

Another switch 83 is positioned below the path of the case and provided with a switch arm 84 extending into the path. These switches are in series as shown and in a shunt circuit around the motor 10. They are also in series with a relay 85 controlling the motor circuit. The switches 81 and 83 are in parallel with an intermittently operated switch 86 also shunted around the motor.

The switch 86 is located adjacent the main shaft 4 and is opened once during each revolution thereof by means of an insulated cam 87 thereon.

The operation of opening the case 48a is synchronized with the opening of switch 86 in such a manner that while the switch 86 is open the switches 81 and 83 will be closed by a completely opened case thereby retaining a closed circuit shunted around the motor 10 and causing the relay 85 to maintain the motor circuit closed. If the case 48a fails to completely open, then one or the other, or both, of the switches 81 and 83 will remain open thereby stopping the motor 10 and the entire operation of the machine until the defective case has been removed or completely opened and the switches 81 and 83 are closed thereby, or until a manually operated switch 88 is temporarily closed to start the motor until the machine has operated sufficiently to allow the switch 86 to close and thereby continue the operation of the machine by causing another case to be removed from the magazine and opened.

After the case has been opened and accurately positioned, the clutch tripping mechanism illustrated in Fig. 7 operates to disengage the main clutch 6 and thereby stop the conveyer 2 to allow the case to be filled. The opened case is thereby positioned and stopped in alignment with a transversely operating loading mechanism which simultaneously moves groups of containers, which latter are, in the present instance, illustrated as cylindrical cans, into each end of the opened case thereby completely filling it and immediately another intermittent movement of the conveyer 2 takes place to remove, open and position another case. The opening, loading and discharging cycle may continue indefinitely or as long as containers and collapsed cases are supplied to the machine.

As shown in Figs. 1, 14, and 20, and diagrammatically illustrated in a modified form in Fig. 23 and as previously stated, a conveyer 16 is positioned on each side of the machine in parallel relation with the conveyer 2 but in a lower plane.

These conveyers 16 comprise a plurality of conveyer chains 89 arranged in aligned pairs as indicated in Fig. 14, each pair being arranged to convey a row of containers 90. These conveyers are in continuous operation and a suitable automatic detent means is provided whereby the containers are intermittently stopped and groups are positioned in alignment with the loading position of the open cases. In the embodiment illustrated, each group comprises twelve containers and two groups completely fill a case.

A transverse rock shaft 91 (Figs. 20 and 22) is mounted underneath the conveyers 16 and provided with escapement bars 92. These bars 92 may be of any suitable length and are adjacent the path of the containers and are provided at each end with escapement pins 93 and 93a which are alternately moved into the path of the containers by the movement of the rock shaft 91.

The rock shaft is also provided with a cam arm 94 engaging a cam 95 on the main cam shaft 20 so that with each revolution of the cam shaft the pins at opposite ends of the escapement bars are alternately positioned in the path of the cans so that when the forward pins are raised all of the containers on both of the conveyers 16 are stopped while the conveyers continue to move. When the position of the escapement is reversed, the rear pins are raised and a group of twelve containers on each conveyer will be released and allowed to move forward to the loading station where they will be stopped by a cross bar 96 secured to the frame and will then be in position for loading into the case. During each intermittent operation of the machine the continuously operated conveyer 16 and the escapement mechanism associated therewith will position groups of containers adjacent the ends of the open cases.

The automatic mechanism for loading the groups into the case is completely illustrated in Figs. 1 and 12, and 14 to 19, inclusive, and comprises carriages 97 mounted between and supported on the transverse channel irons 39 in frame 1. The carriages are positioned directly above the assembled groups on the conveyers 16. Each carriage comprises a rectangular frame 98 on which is supported a plurality of vacuum cups 99. These cups are arranged in parallel rows corresponding to the parallel rows in the assembled container groups.

A suitable mechanism is provided whereby each group of containers is raised from the conveyer sufficient to engage the vacuum cups 99 which latter are controlled from a suitable vacuum source by a valve mechanism which will be described later, and whereby the containers may be moved into the case by movement of the carriages.

The mechanism for raising the containers into engagement with the vacuum cups comprises a frame 100 having can guides 101 thereon and which is mounted for vertical movement on longitudinal angle irons 102. Lateral movement of the frame (Figs. 20, 21, and 22) is prevented by means of guide rods 103 extending through the angle bars 102 of the frame.

The frame 100 is raised by means of the mechanism illustrated in Figs. 20 and 22 and comprises bell cranks 104 and 105 pivotally mounted at 106 and 107, respectively. These bell cranks are connected together by means of a link 108 so that they operate simultaneously to raise the frame 100 and the containers thereon.

Upwardly extending arms of the bell cranks rest against suitable cross bars on the frame 100 and the bell crank 104 is provided with a cam arm 109 operatively engaging a cam 110 on the main cam shaft 20. Obviously with each revolution of the cam shaft 20, a group of cans or containers may be raised into a position to engage the vacuum cups. The containers will be retained by the vacuum cups and the frame 100 will be immediately lowered to a position to receive the next group of cans from the escapement mechanism.

The carriages 97 (Figs. 14 to 19) are provided with oppositely disposed bearings 111 and are pivotally mounted on hangers 112, which hangers are provided with rollers 113 and are thereby suspended for longitudinal movement on tracks 114 on the transverse channel irons 39. Each of the hangers 112 is provided with a rack 115 which is secured thereto. These racks are in engagement with suitable pinions 116 which latter are secured to a shaft 117 pivoted in suitable bearing blocks 118.

These bearing blocks are also provided with guide rollers 119 for retaining the racks in engagement with the pinions.

The racks and hangers are provided on each of the transverse channel irons 39, and the arrangement of racks, pinions and transverse shaft is such that when one carriage is moved the other will move simultaneously therewith through the operation of the inter-engaging racks and pinions and the shaft 117.

The movement of the hangers 112 and the carriages supported thereby is controlled by a cam 120 on the main cam shaft 20 (Fig. 15). This cam is provided with a slot 121 having a cam roller 122 engaged therein. The cam roller is secured to a vertical slide member 123 which is provided at its upper end with a rack 124 engaging a pinion 125 secured to a short shaft 126 mounted in a suitable bearing on the channel iron 39. A gear 127 is secured to this shaft 126 and is in mesh with one of the carriage racks 115. With each rotation of the cam 120, both of the carriages 97 will be moved inwardly by means of the rack and pinion transmission, to move the groups of containers into the opened case as illustrated in dotted lines in Fig. 16.

In order that the cans or containers may be retained by the vacuum cups, all of the cups are connected by means of suitable tubing to a main conduit 128 which is, in turn, connected through a valve 129 (Fig. 17) to a suitable vacuum source. The valve 129 is controlled by means of a cam 130 on the main cam shaft 20. The cam 130 is arranged so that the vacuum will be applied when the cans are raised against the vacuum cups and will be released at the moment that the cans are completely inserted in the case. It is necessary that the group of containers should be moved through an arcuate path immediately upon starting the longitudinal movement of the carriage in order that they may be brought into parallel alignment with the open end of the case before insertion. This is accomplished by means of an arm 131 on each carriage pivot and provided with a roller 132 which is at all times in engagement with a surface cam 133 on the frame.

It will be evident that any inward longitudinal movement of the hangers 112 will cause the carriages to be rotated through substantially ninety degrees by engagement of the rollers 132 with the cams 133. This movement takes place immediately upon the start of the longitudinal movement and aligns the containers with the open end of the case and the continued longitudinal movement inserts the containers therein. The carriage is then immediately withdrawn and returned to its original position by means of the cam 120 and the rack and pinion mechanism described previously.

In order that the bottom end flaps 48b of the case may not interfere with the arcuate movement of the containers, a suitable mechanism is provided for moving them downwardly and retaining them out of the path of the containers. This mechanism is particularly illustrated in Figs. 11 and 12 and comprises forwardly extending parallel shafts 134 having upturned ends 135 thereon arranged to engage each of the case flaps 48b and move them downwardly to an angular position when shafts 134 are partially rotated.

The shafts 134 are provided with bevel pinions 136 engaging bevel gears 137 on a transverse rock shaft 138. This rock shaft is connected, by means of an arm 139 and a link 140, to a spring controlled cam arm 141 pivoted on the frame at 142.

The cam arm 141 is provided with a roller 143 engaging a cam 144 on the shaft 4 of the conveyor 2. This flap opening mechanism is so timed as to operate during the opening of the case and its forward movement in the direction of the arrow as shown in Fig. 11. As soon as the case is sufficiently opened the rotation of the shafts 134 cause the ends 135 to engage and push the flaps 48b downwardly. However, during the squaring-out process the case 48a travels forwardly until only the forwardly extending portion 135a engages or is engaged by the flap. The case having completely opened and passed beyond the end of the shaft 134 thereby leaves the arcuate path of the containers unobstructed.

In the embodiment shown, and as specifically illustrated in Fig. 14, the conveyers 16 are arranged in such a manner that the rows of cans thereon are separated by guide bars 145. These guide bars do not extend into the grouping zone. However, the rows in each group are laterally spaced and remain in this position when they are raised into engagement with the vacuum cups.

In order that the cans may be snugly grouped for insertion in the case, certain of the rows of vacuum cups are movably mounted on the carriage frame 98 whereby during the raising of the cans through the arcuate path the rows will be moved together by gravity and the group snugly assembled for insertion.

In order to accomplished this, the outer row of vacuum cups is rigidly connected to the carriage (Fig. 18), the middle and inner row being connected to slidable bars 146 and 147, respectively. These bars are secured to slides 146a and 147a, respectively, which latter are slidably mounted on suitable guide rods 148. The bars 146 and 147 and the vacuum cups thereon are normally retained in spaced relation by means of springs 149.

During the movement of the carriage through the arcuate path to bring the containers into alignment with the case, the weight of the containers overcomes the springs 149 and they are thereby assembled into a compact group by gravity.

After the container has been filled and the carriages have been immediately returned to normal position, the main clutch 6 is again automatically engaged to move the conveyer 2 and the filled case thereon out of the loading position and to remove a succeeding collapsed case from the magazine and open it in the loading position.

During the movement of the filled container from the loading station, the end flaps of one end of the case are closed by the mechanism illustrated in Figs. 1, 4, and 13 which comprises a transverse rock shaft 150 having a curved arm 151 thereon which arm is provided with an outturned end 152 for engaging the rear vertical flap 48c during the forward movement of the case. This engagement and consequent closing of the flap is caused by the operation of the rock shaft 150 by means of a cam 153 on the conveyor shaft 5.

The cam 153 is engaged by a roller 154 on an outwardly extending arm on a short rock shaft 155. This latter shaft 155 is provided with an arm 156 which is connected to a similar arm on the rock shaft 150, by means of a link 157.

With each intermittent operation of the conveyer 2, the flap closing arm 151 will be moved as illustrated in Fig. 13 to close the flap 48c. The out-turned end of the arm 152 is arranged to first engage and move the flap and to allow the inner portion of the arm 151 to press the flap to a completely closed position.

During the forward movement of the filled case, the forward flap 48d will be closed by reason of its engagement with a curved closing member 158 which is secured to the frame and extends into the path of the flap. The upper and lower flaps will then be closed by reason of their engagement with suitable forwardly extending flap folders 159 which are also secured to the frame. These flap folders 159 are elongated as shown in Fig. 1 for the purpose of retaining the flaps in closed position until the filled case is discharged from the machine.

The discharge end of the machine is provided with a roller 160 adjacent the end of the conveyer 2 (Figs. 1 and 4). This roller is positively driven from the conveyer shaft 5 by means of a chain 161 on suitable sprockets.

It is desirable that when the cases are discharged from the machine they should be turned and so positioned on another discharge conveyor 162 in such a manner that they will be positioned with the open end up. This requires turning the filled case to a vertical position and this is accomplished by a suitable turning device, illustrated in Figs. 2, 4, and 5, and which comprises a pivoted frame 163 having a plurality of rollers 164 thereon.

This frame is positioned so that the rollers are in alignment with the conveyer 2 and the case is moved onto the rollers 164 as it is discharged from the conveyer 2 and associated roller 160.

The frame 163 is pivoted at 165 and provided with a weight 166 which normally holds the carriage in the upright position illustrated in Fig. 5. However, when the filled case has been deposited on the turning frame, the weight of the case causes the frame to move to the dotted line position thereby depositing the case on rollers 167 from which it is moved to the conveyer 162.

The rollers 167 are driven by a sprocket and chain connection, as shown in Fig. 2, and including a sprocket 168 on the speed reduction box 11 and the chains 169 and 170 and the roller sprockets cooperating therewith.

An upwardly extending arm 171 on the frame 163 prevents the reopening of the flaps and also supports the loaded case as it is being moved to the rollers 167.

In order to retard the movement of the turning frame 163, a resistance device is provided, which, in the present instance, comprises a device 172 similar to an ordinary doorcheck and which is secured to the frame 1, and the operating arm 173 of this resistance device is connected to the turning frame 163 by means of a link 174.

It will be understood that when the loaded case is moved down to the turning frame the weight of the device will cause the case to be lowered onto the rollers 167. However, this operation will be resisted by the check means 172 and the container will be easily and quietly lowered to the dotted line position shown and will then be carried forward onto the conveyer 162. As soon as the case has moved out of alignment with the rollers on the frame, the frame will be released and returned to normal position by means of the weight 166.

While the embodiment described previously herein is adapted for completely filling cases with two layers or groups of containers and with a single operation, the invention also contemplates certain minor modifications whereby a machine may be adapted to fill containers with a plurality of layers when desired.

In embodying the invention in a machine for this purpose two or more loading stations may be provided together with the necessary additional container carriages which may be controlled simultaneously with those described previously by merely extending the rack-connecting pinion shaft 117 forwardly and providing the necessary pinions thereon to engage with the added racks. The same carriage control mechanism, that is, the cam 120 and associated parts are used for driving all of the racks.

Fig. 23 is a diagrammatic view illustrating the position of the containers on the conveyers 16a which latter are similar to the conveyers 16 but are extended forwardly to accommodate the second loading station.

In this construction, the first loading station A is similar to that previously described and is in the vertical plane of the opened case. The container conveyers 16a are extended sufficiently to provide a second loading station B in advance of the first and in alignment with the second position of the case which has previously been loaded with two layers of containers at station A.

In this construction the machine is somewhat wider and in fact may be of any desired width corresponding to the number of layers which it is desired to load into the cases.

In the present instance four layers have been illustrated and in the first operation at station A, which is identical with the operation described for the single station machine, each group of cans is moved into the case to the positions indicated by the heavy dotted lines therein.

The case then moves to station B where the same operation is repeated simultaneously with the loading of two more groups in the succeeding case which has been opened and positioned at station A.

At station B the groups are inserted to the same position as groups inserted at station A and take the position indicated by the light dotted lines at station B. As these layers are inserted at station B, they push inwardly the previously inserted layers and thereby completely fill the case. The folding mechanism then folds the flaps at one end of the case and it is discharged from the machine as described previously.

In this latter embodiment the detent mechanism for separating the groups of containers is somewhat modified and is diagrammatically illustrated in Fig. 24. This comprises an escapement bar 175 having pins 176 thereon and intermittently operated by a cam 177 on the shaft 20. The cam cooperates with a cam arm 178 on the detent bar. This detent bar operates in a similar manner to the bar previously described but allows the escapement of eight containers instead of four.

The escapement bar 175 is connected to a second escapement and detent bar 179 pivoted immediately in front of the first loading station. This bar is provided with container engaging pins 180 and is connected to the escapement bar 175 by means of links 181 and 182 and the pivot lever 183 so that when the eight containers are released by the escapement bar 175, the remaining cans will be retained by the pins 176 and the eight released containers will travel forwardly and be stopped by the forward pin 180 on the escapement bar 179. The continued rotation of the cam then causes the position of the escapement bars 175 and 179 to be reversed and the re-escapement pin 180 retains four containers at the loading station A while the four forward containers are released by the forward escapement pin 180 and move on to the loading station B.

In this construction the conveyers 16a are geared to a somewhat higher speed than the conveyers 16 thereby very rapidly moving the groups of containers to their respective stations.

The containers at these stations are then raised into engagement with the vacuum cups in the same manner as when the single station machine is used, the raising arms 104a and 105a at the station B being connected to the container raising mechanism of the first loading station A by means of a connecting rod 184, whereby the raising mechanism of both stations is operated simultaneously by the cam arm 109 operating on the cam 110.

The container carriages and the supporting and operating mechanism are identical for the two stations, the carriage operating connections being illustrated in Fig. 25 wherein the racks 115a of the second station are connected with the racks 115 of the first station by means of the extended shaft 117a which is provided with pinions 116a for engagement with the racks.

With this construction either two, three or four layers may be loaded in containers for in order to load three layers, it is only necessary to change the container group escapement mechanism to assemble a group of cans on the conveyer at one side of the machine at station A only, and to prevent the assembly of a group at station B. In this case, the operation of the device will be the same but only three layers will be inserted.

Figs. 26 and 27 illustrate a modified form of the device illustrated in Figs. 11 and 12 for moving the case flaps 48b out of the arcuate path of the containers and comprises shafts 185 which correspond in function to the shafts 134 in Fig. 11 but are operated in the reverse direction by reversing the position of the bevel gears 137 on the shaft 138.

These shafts 185 are provided with slidable arms 186 having vacuum cups 187 thereon. Each arm is normally urged toward the rear of the shaft 185 by means of a spring 188.

During the forward movement of the case 48a toward the loading station, the vacuum cups 187 are brought into contact with the bottom surface of the flaps 48b through the controlling mechanism. The cups move forward simultaneously with the case due to the slidable connection of the arm 186 with the shaft 185. They are simultaneously moved downwardly to the position indicated in Fig. 27 and thereby retain the flaps of the arcuate path of the containers.

The vacuum cups 187 may be controlled by any suitable valve means similar to that described previously herein.

Figs. 28, 29, and 30 illustrate a modified form of carriage wherein the vacuum cups are replaced by mechanical means for engaging and lifting the containers. This embodiment comprises a plate 189 having bars 190 slidably mounted thereon. These bars are connected with an equalizing mechanism comprising the connecting links 191 and link 192.

A cylinder 193 may be mounted on a portion of the carriage and is provided with a piston therein connected to the link 192 by connecting rod 194.

This piston and cylinder provide a vacuum controlled device which may be connected to the vacuum system of the machine and operated to control the mechanical structure shown in the same manner as the vacuum cups are controlled.

In this embodiment all of the container gripping means are simultaneously controlled to grip the containers when they are brought into engagement with the carriage plate 189.

The slide bars and connecting links together with the piston are normally urged in an upward direction relative to Fig. 28 by means of a spring 195.

Downwardly extending can engaging means 196 are rigidly attached to the plate 189 so that two of these can engaging members are adjacent each can as it is raised from the conveyers to be engaged thereby.

The slide bars 190 are limited in movement by slots 190a engaging suitable retaining bolts and these slide bars are provided with cross bars 197 secured to the slide bars 190 and having downwardly extending can engaging members 198 corresponding to the fixed members 196.

These can engaging members 198 which are rigidly fixed to the slide rods are in a position to clamp the outer row of containers in the group when the vacuum controlled mechanism is operated.

All of the can engaging members 196 and 198 are of a contour conforming to the contour of the rim of the can as indicated in Fig. 30, and the can is thereby rigidly retained in engagement.

The second and third row of cans in the group are also engaged by downwardly extending can engaging members 198 secured to cross bars 199 which latter are held in yieldable relation to the slide bars 190 by means of springs 200.

The cross bars 199 are limited in movement relative to the slide bars 190 by means of a suitable bolt and slot connection therewith as illustrated. By means of this arrangement when the vacuum is released from the cylinder 193, the spring 195 moves all of the slide bars 190 to cause the outward movement of all of the can engaging members 198.

When the vacuum is applied to cause the cans to be gripped, the yieldable connection between the slide bars 190 and the cross bars 199 compensate for any variation in the size of the containers.

It will be understood that this embodiment may be operated either by the vacuum means illustrated or may be controlled by a suitable mechanical connection for moving the slide bars 190.

While the embodiment illustrated is described as adapted for loading small containers in cases, and in the present instance twelve containers have been disclosed in each group, it is intended that the invention may be adapted for loading containers of various sizes and any suitable number may be assembled in each group.

It will also be understood that the entire disclosure is illustrative only and that modifications may be made by those skilled in the art and it is desired, therefore, that the invention be limited only by the prior art and the scope of the appended claims.

Having thus described my invention, what I claim and desire to secure by Letters Patent is:

1. In an automatic casing machine, means for assembling spaced groups of containers, means for squaring out a collapsed case between said groups, and means for inserting said groups simultaneously into said case.

2. A casing machine of the character described comprising means for squaring out a collapsed case, means for moving containers in one direction to form groups, a carriage, means for moving said groups into engagement with said carriage, and means to cause a two-directional movement of said carriage to move each group into a case.

3. A casing machine of the character described comprising means for consecutively squaring out collapsed cases, means for moving groups of containers consecutively to points adjacent said squared out cases but out of axial alignment therewith, means for removing said groups from engagement with said moving means, other means for engaging and moving each group in a direction to align said group with said container, and means for changing the direction of movement to insert each consecutive group in each consecutive case.

4. A casing machine of the character described comprising means for consecutively squaring out collapsed cases, means for moving groups of separated rows of containers consecutively to points adjacent each case, means for engaging and moving each group in one direction, and cam means for changing the direction of movement to cause the group to be inserted in said case, and means for causing the rows to move to closely adjacent position during the movement of the group.

5. An automatically operable case loading machine of the character described comprising an intermittently operable conveyer, means for squaring out a collapsed case in transverse axial relation on said conveyer, means for assembling a group of containers adjacent each end of said case but below the axial line thereof, and transversely movable means for engaging said groups and moving them into said case.

6. An automatically operable case loading machine of the character described comprising an intermittently operable conveyer, means for squaring out a collapsed case in transverse axial relation on said conveyer, means for assembling a group of containers adjacent each end of said case but below the axial line thereof, and transversely movable means comprising pivotally mounted carriages for supporting and conveying said groups into said case.

7. An automatically operable case loading machine of the character described comprising an intermittently operable conveyer, means for squaring out a collapsed case in transverse axial relation on said conveyer, means for assembling a group of containers adjacent each end of said case but below the axial line thereof, and transversely movable means comprising pivotally mounted carriages for supporting and conveying said groups into said case, and vacuum controlled means for retaining said groups on said carriages.

8. In a casing machine of the character described, the combination with a magazine for collapsed cases, of a conveyer for moving collapsed cases consequently from said magazine, means cooperating with said conveyer for squaring out each consecutive case, means for stopping said machine if said case is misplaced, container conveyers adjacent said case conveyer for consecutively positioning a group of containers adjacent each end of each consecutively opened case, and means for causing a two directional movement of each group into said case.

9. In a case loading machine of the character described having a loading zone, means for removing a collapsed case from a stack and squaring it out in the loading zone, means for automatically grouping containers adjacent the open ends of said case, said containers in each group forming a complete tier, means for moving all of said containers into said case simultaneously, means for moving said case from said loading zone, and means for closing one end of said case during movement from the loading zone.

10. In a case loading machine, a normally horizontal carriage for conveying groups of containers from a group assembling station into a case, means for moving said carriage from a horizontal container-receiving position to a vertical container-delivery position, said carriage comprising a frame, means on said frame for supporting rows of containers in spaced relation when said carriage is in normal horizontal position, and means for causing said rows to move to closely adjacent position while the carriage is being moved to vertical position.

11. In a case loading machine, a normally horizontal carriage for conveying groups of containers from a group assembling station into a case, means for moving said carriage from a horizontal container-receiving position to a vertical container-delivery position, said carriage comprising a frame, vacuum means on said frame for supporting rows of containers in spaced relation when said carriage is in normal horizontal position, and means for causing said rows to move to closely adjacent position when the carriage is moved to vertical position.

12. A case filling machine comprising means for opening a collapsed case and means for simultaneously inserting containers in said case in opposite directions.

13. A machine of the character described comprising means for removing cases intermittently from a stack of the same, means for opening each of said cases to receive containers from each end, means for assembling containers in groups adjacent each end, and means for engaging said groups and inserting them in opposite ends of said case.

14. A device of the character described comprising means for moving a collapsed case from a stack, means for squaring out said case, means for assembling a group of containers adjacent each end of said case and out of axial alignment therewith, means for moving said groups into axial alignment with each other and with said case, and means for moving said groups into said case while retaining said alignment.

15. A casing machine comprising means for opening a collapsed case, means for moving vertical containers adjacent the open ends of said case, and means for engaging and inserting a group of said containers in a horizontal position in each end of said case.

16. A casing machine of the character described comprising means for opening a collapsed case, means for simultaneously moving vertically positioned containers to form groups adjacent the open ends of said case, and means for turning said groups and inserting them horizontally into said case.

17. A plurality of conveyers, means for assembling groups of containers on said conveyers, means for positioning open end cases between said conveyers, means for causing an arcuate movement of said containers into alignment with said cases, and means for inserting one of each of said moved groups into each end of each of said cases.

18. In a case loading machine of the character described having a loading station, means for squaring out a case in said loading station, a container conveyer adjacent said loading station, means for bodily lifting groups of separated rows of containers sufficient to form a complete layer from said conveyer, and other means for moving said group into said case and simultaneously moving said rows to closely adjacent position to insure the compact contactual encasement of said containers.

19. In a case loading machine of the character described having a loading station, means for squaring out a case in said loading station, a container conveyer adjacent said squared out case, means for moving a group of containers from said conveyer and into said case, said last means comprising a carriage having container supporting means thereon, and means for lifting said group into engagement with said supporting means.

20. A case loading machine of the character described comprising a magazine for supporting a stack of collapsed cases, an intermittently movable horizontal conveyor for moving said collapsed cases consecutively from said magazine, means for squaring out each case at a loading station and in a horizontal axial position on said conveyor, means for assembling groups of containers adjacent said loading station, means for moving said groups to completely fill said case, means for thereafter closing one end of said case during another intermittent movement of said conveyor, and gravity operated means for receiving said case in said horizontal position and depositing it on the closed end on a discharge conveyer.

21. A case loading machine of the character described comprising a magazine for supporting a stack of collapsed cases, an intermittently movable conveyer for horizontally moving said collapsed cases consecutively from said magazine, means for squaring out each case at a loading station and in a horizontal axial position on said conveyor, means for assembling groups of containers adjacent said loading station, means for moving said groups to completely fill said case, means for thereafter closing one end of said case during another intermittent movement of said case, and gravity operated means for receiving said case in said horizontal position and automatically operable transversely to said conveyor to deposit said case in a vertical position on a discharge conveyer.

22. An automatically operable case loading machine of the character described comprising an intermittently operable conveyer, means for squaring out a collapsed case in transverse axial relation on said conveyer, means for assembling a group of containers adjacent each end of said case but remote from the axial line thereof, and transversely movable means for engaging said groups and moving them into said case, said transversely movable means including vacuum controlled engaging means individual to each container.

23. In a case loading machine of the character described, the combination with a mechanism for grouping containers in spaced relation and a case positioning mechanism associated therewith, of a carriage for moving groups of containers, said carriage comprising a support, a group of spaced container-engaging means on said support for engaging individual containers, means for maintaining said engaging means in spaced relation when said carriage is in one position and said engaging means being automatically movable into a more compact group when said carriage is moved to another position.

24. In a casing machine of the character described, a continuously movable conveyer for moving vertically positioned containers, an intermittently movable casing conveyer, and means synchronized with said intermittently movable conveyer to move said vertically-positioned containers from said first conveyer to a horizontal position in a casing on said intermittently movable conveyer.

25. In a casing machine of the character described, a continuously movable conveyer for moving vertically positioned containers, an intermittently movable casing conveyer, and transversely movable means synchronized with said intermittently movable conveyer to move said vertically-disposed containers from said first conveyer to a horizontal position in a casing on said intermittently movable conveyer.

26. In a casing machine of the character described and having a loading station, means for squaring out a case at said loading station, means for positioning a group of containers adjacent the open end of said case, a carriage support reciprocable parallel with the axis of said case, a carriage on said support and arranged to receive said group, and means to rotate said carriage during movement of said support to move said group into axial alignment with said container whereby continued movement will insert the group in the case.

27. In a casing machine of the character described and having a loading station, means for squaring out a case at said station, means for positioning a group of containers adjacent each end of said case, oppositely disposed carriage supports reciprocable in a plane parallel with the axis of said case, carriages on said supports and arranged to move said groups into said case, and means to rotate said carriages during movement of the supports to move said groups into axial alignment with said case.

28. In a casing machine having a loading station, means for supporting an open end case at said station, a carrier for containers and reciprocable parallel with the axis of said case, means for supporting a group of containers on said carrier with their axes in angular relation to the axis of said case, and means for moving said carrier to bring said group of containers into axial alignment with the open end of said case.

29. In a casing machine having a loading station, means for supporting an open end case at said station, a container support, a carrier for said support reciprocable only in a direction parallel with the axis of said case, means for retaining a group of containers on said support and out of alignment with said case, and means for moving said containers into alignment with said case whereby a succeeding movement of the carrier will move the containers into the case.

30. The method of loading containers into a case which comprises inserting containers through both ends of said case and in opposite directions to form a plurality of layers of containers in said case.

31. The method of loading containers into a case which comprises simultaneously inserting groups of containers in opposite directions into the case.

32. The method of loading containers into a case which comprises assembling a plurality of groups of containers and thereafter inserting them into said case from opposite directions to encase a plurality of layers or tiers of containers within said case.

33. The method of loading containers into a case which comprises assembling a plurality of groups of containers, each group composed of rows of containers, said containers being assembled in contactual relation, and thereafter inserting said thus assembled groups into said case from opposite directions with the groups in axial relation to encase a plurality of layers or tiers of containers within said case.

34. The method of loading containers into a case which comprises isolating a predetermined number of containers to form layers or tiers, compacting said isolated containers into a group wherein the containers are in contactual relation, and thereafter inserting said assembling groups into said case from opposite directions in axial relation to encase said isolated containers in compact, minimum-space-consuming fashion in said case.

35. In a case loading machine for continuous automatic operation, the combination with means for positioning a case to simultaneously receive a plurality of groups of containers with each group forming a layer, and means for inserting said groups, of conveyors for moving containers to points adjacent said inserting means, and escapement means associated with said conveyors for causing all of the containers of a group to assemble simultaneously in adjacent rows of predetermined relative length and position.

36. In a case loading machine of the character described, means for consecutively opening collapsed cases at a loading station, means for continuously feeding containers to points adjacent opposite ends of said opened cases, trip means for causing said containers to assemble into symmetrical groups of predetermined numbers of rows and a predetermined number of containers in each row, and means for inserting said assembled groups into said case from opposite directions.

37. In a case loading machine of the character described, means for consecutively opening collapsed cases at a loading station, conveyors for moving containers in rows to points adjacent said loading station, escapement means associated with said conveyors for permitting said containers to form groups adjacent said loading station, each group forming a layer having a predetermined number of containers in each row, and means for inserting said groups in said container in opposite directions.

38. A case filling machine comprising means for opening a collapsed case in a manner to receive containers, means for simultaneously inserting containers in said case in opposite directions, and means cooperating with a completely opened case to control the operation of the inserting means.

39. In a case loading machine of the character described, the combination of a conveyor for moving collapsed cases, a squaring out mechanism associated with said conveyor, said squaring out mechanism comprising vacuum means for engaging the one surface of a collapsed case and movable with said case after engagement to prevent displacement relative to said conveyor, a second vacuum means constructed and arranged to engage the opposite surface of said collapsed case, said second means being also movable with said carton, means to raise said second means after engagement to tend to open said case, and movable stop means constructed and arranged to engage the forward edge of said collapsed case and co-operate with the conveyor to completely square out the case.

40. In a machine of the character described having a case loading station and means for loading cartons into squared out cases at said station, the combination of a conveyor for moving collapsed cases, a squaring out mechanism associated with said conveyor, said squaring out mechanism comprising a vacuum cup for engaging the bottom wall of a case and movable with said case after engagement to prevent displacement of said wall relative to said conveyor, a second vacuum cup positioned above said conveyor and arranged to engage the rear wall of said case, said second cup being also movable with said carton, means to raise said second cup after engagement to tend to open said case, and movable stop means to engage and raise the forward edge of said collapsed case, all of said mechanism cooperating to square out said carton at said loading station.

41. A case opener for a machine of the character described comprising means for engaging the rear edge of a collapsed case and moving said case toward a loading station, vacuum cups for substantially simultaneously engaging the bottom wall and the rear side wall of said case during its movement toward said station, said cups being movable with said walls, means tending to separate said cups to simultaneously cause said case walls to separate, means to release said cups, and means to engage and raise the forward edge of said collapsed case and constructed and arranged to open said case and locate the upper wall at the loading station substantially simultaneously with the positioning of the lower wall thereunder.

42. A case loader comprising a magazine for holding a stock of collapsed cases, a horizontal conveyor under said magazine and arranged to move consecutive cases from said magazine to a loading station, spaced flights on said conveyor for engaging the rear edges of a collapsed case, a hinged stop for engaging the front edge of said case, said stop being constructed and arranged to cooperate with a flight on said conveyor to cause said case to square out at a loading station, means engaging the bottom wall of said collapsed case and movable therewith to retain the bottom wall on said conveyor, and means engaging the rear side wall of said collapsed case and movable therewith, means tending to separate said engaging means to partly square out said case, and means to release said engaging means before said case is completely squared out, and means adjacent the loading station to load containers into said case.

JOSEPHUS J. THAYER.

CERTIFICATE OF CORRECTION.

Patent No. 2,050,547.	August 11, 1936.

JOSEPHUS J. THAYER.

It is hereby certified that error appears in the printed specification of the above numbered patent requiring correction as follows: Page 6, first column, line 7-8, for "conveyor" read conveyer; line 37, for "accomplished" read accomplish; page 8, second column, line 71, claim 8, for "consequently" read consecutively; and that the said Letters Patent should be read with these corrections therein that the same may conform to the record of the case in the Patent Office.

Signed and sealed this 13th day of October, A. D. 1936.

Henry Van Arsdale (Seal)	Acting Commissioner of Patents.